(12) United States Patent
August et al.

(10) Patent No.: US 11,463,438 B2
(45) Date of Patent: Oct. 4, 2022

(54) NETWORK DEVICE AUTHENTICATION FOR INFORMATION SECURITY

(71) Applicant: Bank of America Corporation, Charlotte, NC (US)

(72) Inventors: Daniel J. August, Denver, NC (US); Neal Aaron Slensker, Fort Mill, SC (US); Michael R. Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 218 days.

(21) Appl. No.: 17/095,098

(22) Filed: Nov. 11, 2020

(65) Prior Publication Data
US 2022/0150245 A1 May 12, 2022

(51) Int. Cl.
*G06F 15/16* (2006.01)
*H04L 9/40* (2022.01)
*H04L 41/0803* (2022.01)
*H04L 67/54* (2022.01)

(52) U.S. Cl.
CPC ...... *H04L 63/0876* (2013.01); *H04L 41/0803* (2013.01); *H04L 67/54* (2022.05)

(58) Field of Classification Search
CPC .. H04L 63/0876; H04L 67/54; H04L 41/0803
USPC .......................................................... 726/17
See application file for complete search history.

(56) References Cited

U.S. PATENT DOCUMENTS

| 5,675,319 | A | 10/1997 | Rivenberg et al. |
| 7,878,397 | B2 | 2/2011 | Mirkazemi-Moud et al. |
| 8,344,881 | B1 | 1/2013 | Hays |
| 8,346,672 | B1 * | 1/2013 | Weiner ................ G06Q 20/425 705/64 |
| 8,499,173 | B2 | 7/2013 | Caci |
| 8,769,643 | B1 | 7/2014 | Ben Ayed |
| 8,786,272 | B2 | 7/2014 | Carapelli et al. |
| 9,224,146 | B2 | 12/2015 | Hayhow |
| 9,342,717 | B2 | 5/2016 | Claessen |
| 9,357,397 | B2 * | 5/2016 | Suarez Garcia .... H04W 12/128 |
| 9,378,063 | B2 * | 6/2016 | Canoy ................... G06F 9/5044 |
| 9,563,921 | B2 | 2/2017 | Shi et al. |

(Continued)

FOREIGN PATENT DOCUMENTS

| EP | 3479320 A1 | 5/2019 |
| WO | 2017139633 A1 | 8/2017 |
| WO | 2018111601 A1 | 6/2018 |

*Primary Examiner* — Alicia Baturay

(57) ABSTRACT

An authentication device that is configured to receive an authentication request that includes a device identifier from a user device. The authentication device is further configured to identify a first device that is associated with the device identifier and to send a device fingerprint request to the first device. The authentication device is further configured to receive a first device fingerprint for the first device. The first device fingerprint is uniquely associated with the first device and includes a unique bit string that is generated based on a configuration of the first device. The authentication device is further configured to identify a second device fingerprint that is associated with the first device from among a plurality of device fingerprints stored in a memory, to compare the first device fingerprint to the second device fingerprint, and to send an authentication response to the user device based on the comparison.

20 Claims, 3 Drawing Sheets

(56) References Cited

U.S. PATENT DOCUMENTS

| | | |
|---|---|---|
| 9,665,870 B1 | 5/2017 | Rezayee et al. |
| 9,767,453 B2 | 9/2017 | Kushevsky et al. |
| 9,799,180 B1 | 10/2017 | Rezayee et al. |
| 9,888,380 B2 * | 2/2018 | Gupta .................... H04L 63/18 |
| 9,892,293 B1 * | 2/2018 | Wade ................ G06K 7/10277 |
| 10,127,409 B1 * | 11/2018 | Wade ....................... H04K 3/00 |
| 10,235,823 B1 | 3/2019 | Saleh et al. |
| 10,255,603 B1 | 4/2019 | Rezayee et al. |
| 10,311,419 B2 | 6/2019 | Hayhow |
| 10,327,141 B2 * | 6/2019 | Gupta ................... G06F 21/552 |
| 10,373,167 B2 * | 8/2019 | Zovi ................ G06Q 20/4016 |
| 10,475,034 B2 * | 11/2019 | Guise ....................... H04W 4/80 |
| 10,496,914 B2 | 12/2019 | Scaife et al. |
| 10,546,302 B2 * | 1/2020 | Zovi ................... G06Q 20/3825 |
| 10,645,126 B2 * | 5/2020 | Pilnock ................. H04L 67/141 |
| 10,715,536 B2 * | 7/2020 | Klawe .................... G07F 7/088 |
| 10,733,291 B1 | 8/2020 | McLeod |
| 10,740,499 B2 | 8/2020 | Hershman |
| 10,791,461 B1 * | 9/2020 | Gailloux ............... H04W 12/06 |
| 10,911,951 B2 * | 2/2021 | Gupta ................... G06Q 20/425 |
| 11,038,876 B2 * | 6/2021 | Cockerill ............ H04L 63/1433 |
| 11,044,281 B2 * | 6/2021 | Pilnock ................... G06F 9/451 |
| 11,373,194 B2 * | 6/2022 | Dai Zovi ........... G06Q 20/3567 |
| 11,374,949 B2 * | 6/2022 | Klawe ................ H04L 63/1416 |
| 11,410,157 B2 * | 8/2022 | Tesser .................... G06Q 20/40 |
| 2002/0186845 A1 | 12/2002 | Dutta et al. |
| 2011/0078034 A1 | 3/2011 | Hayhow |
| 2011/0107136 A1 | 5/2011 | Jonnagadla et al. |
| 2012/0197798 A1 * | 8/2012 | Grigg ................. G06Q 20/1085 705/43 |
| 2012/0274351 A1 | 11/2012 | Pedersen et al. |
| 2013/0044003 A1 | 2/2013 | Eguro et al. |
| 2013/0086691 A1 | 4/2013 | Fielder |
| 2013/0140364 A1 | 6/2013 | McJones et al. |
| 2013/0179351 A1 | 7/2013 | Wallner |
| 2013/0339739 A1 | 12/2013 | Hueber et al. |
| 2014/0025960 A1 | 1/2014 | McLean |
| 2014/0297540 A1 | 10/2014 | Swamy et al. |
| 2015/0097572 A1 | 4/2015 | Wade et al. |
| 2016/0029221 A1 | 1/2016 | Suarez Garcia et al. |
| 2016/0140545 A1 | 5/2016 | Flurscheim et al. |
| 2016/0155114 A1 | 6/2016 | Kerridge et al. |
| 2016/0210604 A1 | 7/2016 | Hayhow |
| 2016/0335618 A1 | 11/2016 | Koh et al. |
| 2016/0357963 A1 | 12/2016 | Sherman |
| 2017/0293906 A1 | 10/2017 | Komarov |
| 2018/0160306 A1 * | 6/2018 | Gupta ................. H04L 63/0876 |
| 2018/0374071 A1 | 12/2018 | Israeli et al. |
| 2019/0251535 A1 | 8/2019 | Hayhow |
| 2022/0156719 A1 * | 5/2022 | Tesser ................ G06Q 20/3552 |

* cited by examiner

NETWORK DEVICE AUTHENTICATION FOR INFORMATION SECURITY

TECHNICAL FIELD

The present disclosure relates generally to information security, and more specifically to network device authentication for information security.

BACKGROUND

Public network devices such as computers, routers, access points, servers, point-of-sale (POS) devices, automated teller machine (ATM) devices, vending machines, and security devices are typically located in places that are open to the public. Providing information security while using these devices poses a technical challenge because these public network devices are susceptible to attacks from bad actors. For example, a bad actor may gain unauthorized access to the network device by tampering with the software and/or hardware of the network device. Once a bad actor compromises the network device, the bad actor may exfiltrate data from the network device and any other devices (e.g. user devices) that interact with the network device. Existing computer systems are unable to determine whether a public network device has been compromised before a user shares their sensitive information with the network device.

SUMMARY

The system disclosed in the present application provides a technical solution to the technical problems discussed above by allowing a user to authenticate a network device using an authentication device before the user uses their user device to connect to the network device or to exchange data with the network device. The disclosed system provides several practical applications and technical advantages which include a process for requesting information about the current configuration of a network device. This process involves generating a device fingerprint that is based on the current configuration of the network device. The device fingerprint is a unique signal (e.g. a bit string) that is generated based on the current software configuration and/or hardware configuration of the network device. If a bad actor has tampered with the network device, the device fingerprint will be different from a previously stored device fingerprint for the network device. The system compares the current configuration of the network device to a previously stored configuration of the network device to determine whether the network device has been compromised. The system notifies the user about whether it is safe to exchange data with the network device based on the comparison. This process provides information security by allowing the user to verify that the network device has not been compromised before the user connects to the network device or shares sensitive information with the network device.

In one embodiment, the system comprises an authentication device configured to receive an authentication request from a user device. The authentication request includes a device identifier for a network device. The authentication device identifies a network device that is associated with the device identifier and sends a device fingerprint request to the network device. The authentication device receives a first device fingerprint for the network device in response to sending the device fingerprint request. The first device fingerprint is uniquely associated with the network device and includes a unique bit string that is generated based on a current configuration of the network device. The authentication device then identifies a second device fingerprint that is associated with the network device from among a plurality of device fingerprints stored in a memory. The authentication device compares the first device fingerprint to the second device fingerprint and sends an authentication response to the user device based on the comparison. The authentication response indicates whether the network device has passed authentication or whether an issue has been detected for the network device. This process allows the user to verify that the network device has not been compromised before the user connects to the network device or shares sensitive information with the network device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
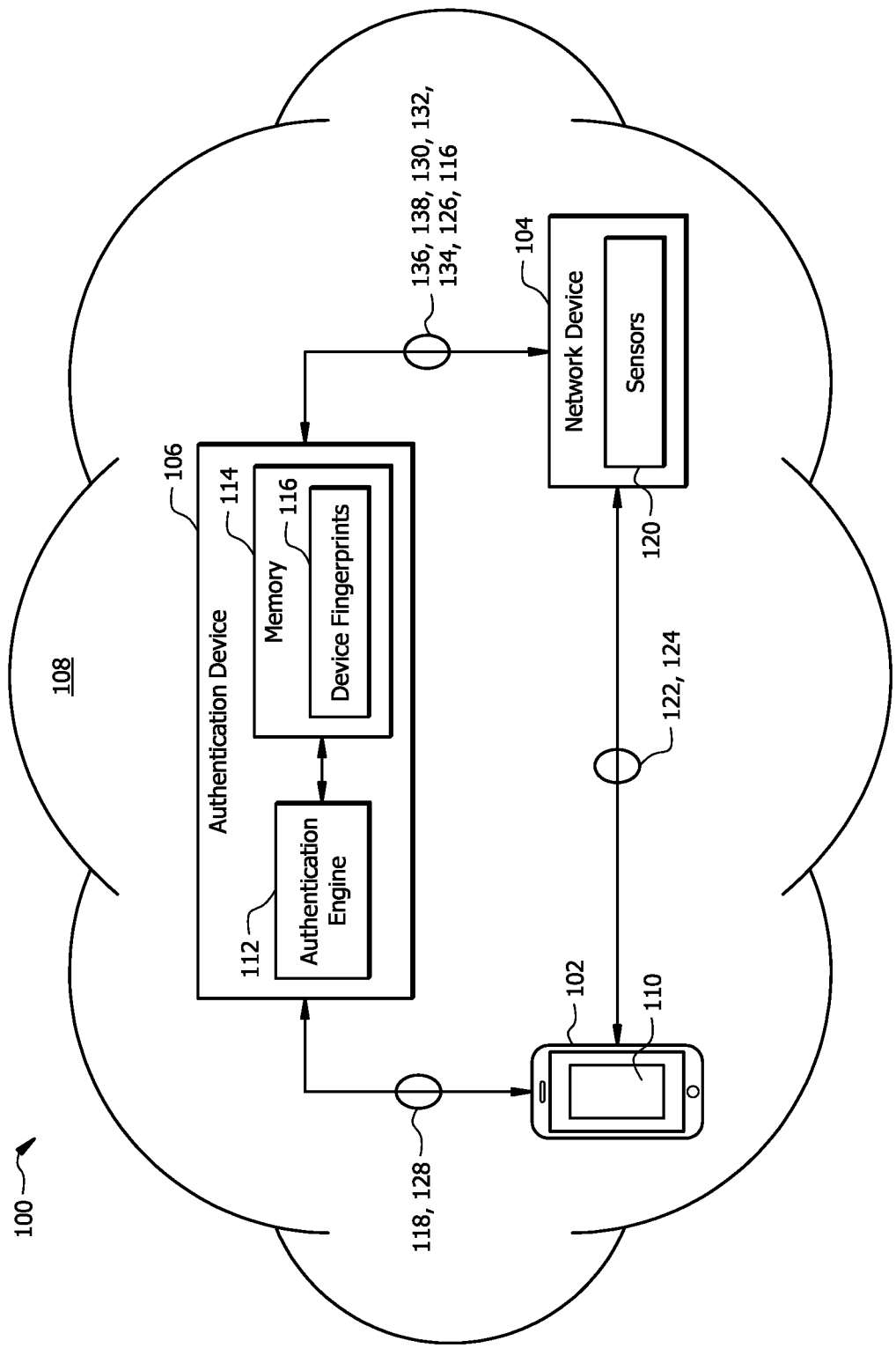
FIG. 1 is a schematic diagram of an embodiment of an information security system.

FIG. 1 is a schematic diagram of an embodiment of an information security system 100. The information security system 100 is generally configured to authenticate a network device 104 before a user device 102 shares sensitive data with the network device 104. For example, a user may want to use their user device 102 (e.g. a smartphone) to exchange personal information with a public computer. As another example, a user may use their user device 102 to connect to a public WiFi network. As another example, a user may want to use their user device 102 to make a transaction with a point-of-sale (POS) device or an automated teller machine (ATM). Network devices 104 are typically located in places that are open to the public which makes them susceptible to attacks from bad actors. For example, a bad actor may tamper with the software and/or hardware of the network device to gain unauthorized access to the network device 104. Once a bad actor compromises a network device 104, the bad actor may exfiltrate data from the network device 104 and any other devices (e.g. user devices 102) that interact with the network device 104. To protect themselves from exposure to a compromised network device 104, a user may employ the information security system 100 to authenticate the network device 104 before the user device 102 connects to the network device 104 or exchanges data with the network device 104. This process provides information security by allowing the user to verify that the network device 104 has not been compromised before the user shares sensitive information.

In one embodiment, the system 100 comprises one or more user devices 102, one or more network devices 104, and an authentication device 106 that are in signal communication with each other over a network 108. In FIG. 1, the network device 104 and the authentication device 106 are shown as two discrete devices. In this example, the authentication device 106 may be an external device or a remote device (e.g. a remote server or a cloud server) from the network device 104. In some embodiments, the network device 104 and the authentication device 106 may be integrated within a single device. For example, a network device 104 may be configured to perform the functionality of the authentication device 106. As another example, the authentication device 106 may be a device that is installed within a network device 104.

The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 108 may be configured to support any suitable type of communication protocol as would be appreciated by one of ordinary skill in the art.

User Device

Examples of user devices 102 include, but are not limited to, a mobile phone, a smartphone, a tablet, a laptop, and a wearable device. The user device 102 may comprise any suitable type of wireless communication hardware interface for communicating with a network device 104 and the authentication device 106. The user device 102 comprises an application 110 that enables the user device 102 to send requests and to receive information from the authentication device 106. For example, the user device 102 may use the application 110 to send device information about a network device 104 to the authentication device 106. In response to sending the device information to the authentication device 106, the user device 102 will receive an authentication response 128 from the authentication device 106 that indicates whether the network device 104 has passed authentication. When a network device 104 passes authentication, this indicates that the network device 104 is secure and has not been compromised. The user device 102 may then securely exchange data with the network device 104. An example of the user device 102 in operation is described in FIG. 2.

Network Device

The network device 104 is generally configured to exchange data with user devices 102. Examples of network devices 104 include, but are not limited to, computers, routers, access points, servers, POS devices, ATM devices, vending machines, security devices, or any other suitable type of device. The network device 104 may comprise any suitable type of wireless communication hardware interface for communicating with a user device 102 and the authentication device 106.

In one embodiment, the network device 104 may comprise one or more sensors 120. The sensors 120 are configured to provide information about the operating conditions of the network device 104. Examples of sensors include, but are not limited to, temperature sensors, global position system (GPS) sensors, security sensors, accelerometers, voltage sensors, or any other suitable type of sensor 120. As an example, the network device 104 may comprise a temperature sensor that measures the current temperature of the network device 104 or the ambient temperature around the network device 104. As another example, the network device 104 may comprise a GPS sensor that determines the current physical location of the network device 104. As another example, the network device 104 may comprise one or more security sensors that determine whether someone has physically tampered with the network device 104. In other examples, the network device 104 may use any combination of sensors 120 to determine the operating conditions of the network device 104.

The network device 104 is further configured to generate a device fingerprint 116 upon request from an authentication device 106. A device fingerprint 116 is a signal or data representation that identifies the current configuration of the network device 104. For example, a device fingerprint 116 may be a unique bit string that is generated based on a configuration of a network device 104. The device fingerprint 116 may be generated based on a software configuration, a hardware configuration, a firmware configuration, location information, temperature information, device tampering status information, or any other suitable type or combination of information about the network device 104. The network device 104 is configured to compile various types of information about the configuration of the network device 104 and to generate a device fingerprint 116 based on the compiled information. For example, the network device 104 may perform a hashing operation on the compiled information to generate a device fingerprint 116. In other examples, a device fingerprint 116 may be represented using any other suitable type of signal or representation that describes the configuration of a network device 104.

In one embodiment, the network device 104 may generate the device fingerprint 116 based on a snapshot of the current operating conditions of the network device 104. In another embodiment, the network device 104 may generate the device fingerprint 116 based on the operating conditions of the network device 104 over a predetermined period of time. The predetermined period of time may be a time period within the last five minutes, the last thirty minutes, the last hour, the last twenty-four hours, or any other suitable time period. In this case, the network device 104 may generate the device fingerprint 116 based on the average operating conditions for the network device 104 over the predetermined period of time.

Authentication Device

The authentication device 106 is generally configured to receive an authentication request 118 that identifies a network device 104. The authentication device 106 is further configured to obtain a device fingerprint 116 from the network device 104 and to compare the device fingerprint 116 to a previously stored device fingerprint 116 to determine whether the network device 104 has been compromised. After determining whether the network device 104 has been compromised, the authentication device 106 sends a response to the user device 102 to indicate whether the network device 104 has passed authentication. An example of the authentication device 106 in operation is described below in FIG. 2.

Examples of an authentication device 106 include, but are not limited to, computers, servers, or any other suitable type of networking device. The authentication device 106 comprises an authentication engine 112 and a memory 114. The authentication device 106 may be configured as shown or in any other suitable configuration. Additional details about the authentication device 106 are described in FIG. 3. The authentication engine 112 is generally configured to authenticate a network device 104 by comparing a current device fingerprint 116 for the network device 104 with a previously stored device fingerprint 116 for the network device 104. An example of the authentication engine 112 in operation is described in FIG. 2. The memory 114 is configured to store device fingerprints 116 and/or any other suitable type of data.

Device Authentication Process

Figure 2:
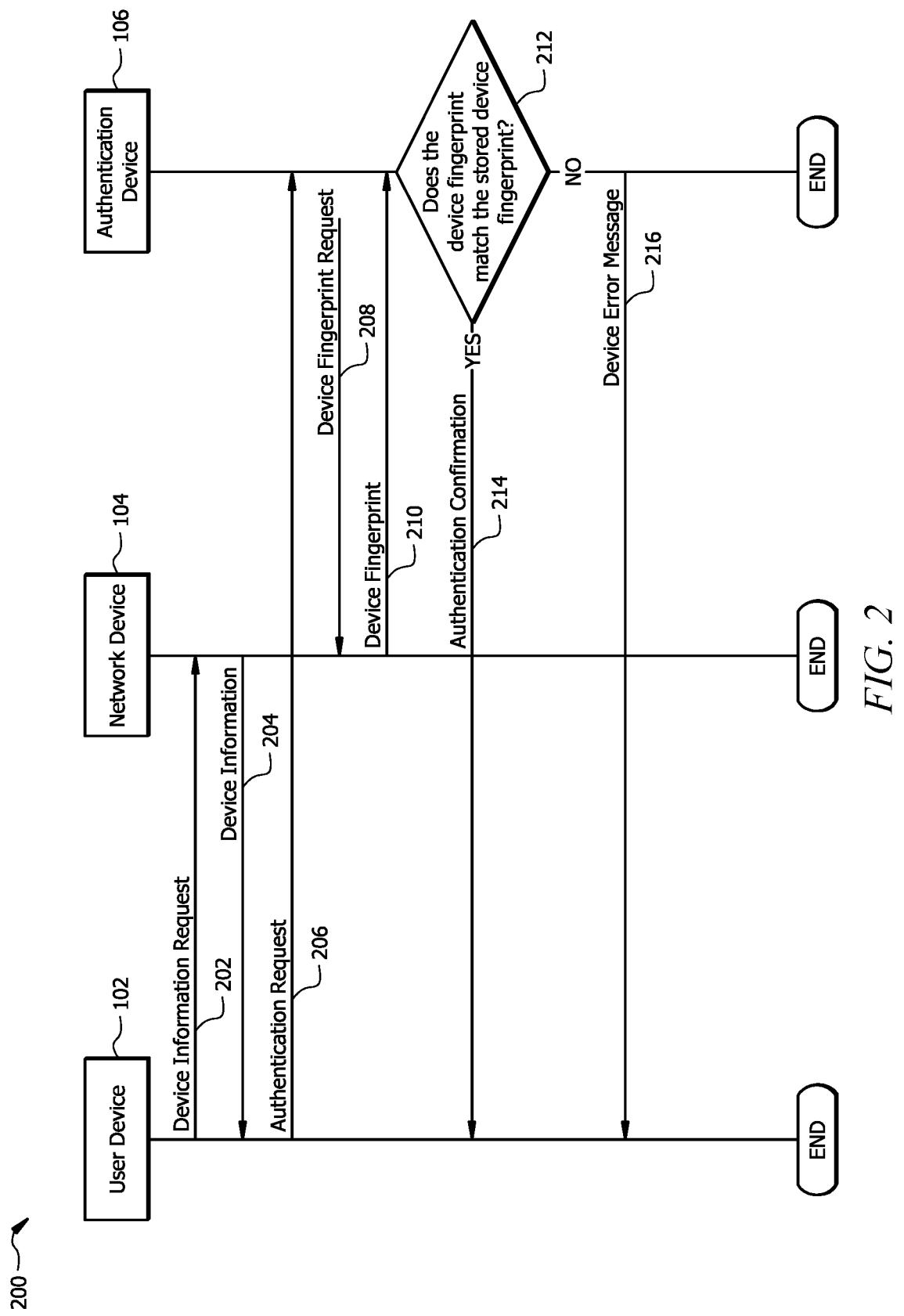
FIG. 2 is a protocol diagram of an embodiment of a device authentication process for the information security system.

FIG. 2 is a protocol diagram of an embodiment of a device authentication process 200 for the information security system 100. The information security system 100 may employ process 200 to authenticate a network device 104 before a user device 102 shares sensitive data with the network device 104. This process provides information security by allowing a user to verify that a network device 104 has not been compromised before the user shares sensitive information with the network device 104 using their user device 102.

At step 202, the user device 102 sends a device information request 122 to the network device 104. The device information request 122 is a request for device information 124 from the network device 104. The device information 124 comprises information that uniquely identifies the network device 104. For example, the device information 124 may comprise a device identifier, a media access control (MAC) address, an Internet Protocol (IP) address, a serial number, a model number, or any other suitable type of identifier for the network device 104. At step 204, the network device 104 sends device information 124 to the user device 102 in response to the device information request 122.

As an example, a user may approach the network device 104 with their user device 102. In this example, the application 110 may be executed before the user approaches the network device 104. As the user device 102 approaches the network device 104, the user device 102 may wirelessly detect the network device 104 using Near-Field Communications (NFC), Bluetooth, or any other suitable type of wireless technology. When the user device 102 is within a predetermined range of the network device 104, the user device 102 may send a device information request 122 to the network device 104.

In another example, the user may trigger the application 110 by interacting with the application 110 to send a device information request 122 to the network device 104. The user may interact with the application 110 by pressing a button, swiping, making a hand or finger gesture, using a voice command, or using any other suitable technique.

In another example, the network device 104 may broadcast its device information 124 in response to detecting that the user device 102 is within a predetermined range of the network device 104. In this example, the user device 102 will automatically receive the device information 124 from the network device 104 when the user device 102 is within range of the network device 104. In other examples, the user device 102 may use any other suitable technique to request device information 124 from the network device 104.

In some embodiments, the user device 102 may obtain the device using a camera on the user device 102. For example, the user may use their user device 102 to capture an image of a device information 124 for the network device 104. In one embodiment, the device information 124 may be represented as a barcode, a two-dimensional barcode, alphanumeric text, or any other suitable type of representation.

At step 206, the user device 102 sends an authentication request 118 to the authentication device 106. The authentication request 118 comprises at least a portion of the device information 124. For example, the authentication request 118 may comprise a device identifier for the network device 104. In other examples, the authentication request 118 may comprise any other suitable type or combination of device information 124 for the network device 104. After receiving the authentication request 118, the authentication device 106 uses the device information 124 to identify the network device 104 that is associated with the device information 124. For example, the authentication device 106 may identify the network device 104 based on its device identifier.

At step 208, the authentication device 106 sends a device fingerprint request 126 to the identified network device 104. In response to receiving the device fingerprint request 126, the network device 104 collects information about its current configuration and operating conditions. The network device 104 then generates a device fingerprint 116 based on the current configuration and operating conditions of the network device 104. The network device 104 may generate the device fingerprint 116 using any of the techniques that were previously described in FIG. 1. After generating the device fingerprint 116, the network device 104 sends the device fingerprint 116 to the authentication device 106.

At step 210, the authentication device 106 receives a device fingerprint 116 from the network device 104. The authentication device 106 also uses the device information 124 that was provided by the user device 102 to obtain a previously stored device fingerprint 116 for the network device 104. For example, the authentication device 106 may use a device identifier for the network device 104 to look-up and identify a previously stored device fingerprint 116 for the network device 104. The authentication device 106 uses the previously stored device fingerprint 116 as a reference point or baseline to determine whether the network device 104 has been compromised or is malfunctioning. If a bad actor has tampered with the network device 104, the device fingerprint 116 will be different from a previously stored device fingerprint 116 for the network device 104.

At step 212, the authentication device 106 determines whether the device fingerprint 116 from the network device 104 matches a previously stored device fingerprint 116 for the network device 104. Here, the authentication device 106 compares the device fingerprint 116 from the network device 104 to the previously stored device fingerprint 116 for the network device 104. The authentication device 106 proceeds to step 214 in response to determining that the device fingerprint from the network device 104 matches the previously stored device fingerprint for the network device 104. In this case, the authentication device 106 determines that the network device 104 is working properly and has not been compromised.

At step 214, the authentication device 106 sends an authentication confirmation to the user device 102. In this case, the authentication device 106 sends an authentication response 128 to the user device 102 that indicates the network device 104 has passed authentication and is secure. The user device 102 may receive the authentication response 128 as an alert, an application notification, a text message (e.g. a Short Message Service (SMS) message), or using any other suitable type of message. After receiving the authentication response 128, the user device 102 may securely connect to the network device 104 and/or exchange data with the network device 104.

Returning to step 212, the authentication device 106 proceeds to step 216 in response to determining that the device fingerprint 116 from the network device 104 does not match the previously stored device fingerprint 116 for the network device 104. In this case, the authentication device 106 determines that the network device 104 is not working properly and may be compromised. At step 216, the sends a device error message to the user device 102. Here, the authentication device 106 sends an authentication response 128 to the user device 102 that indicates that an error has occurred and that the network device 104 has not passed authentication. After receiving the authentication response 128, the user may choose not to connect to the network device 104 or to exchange data with the network device 104 until the issue has been resolved. This process provides information security by notifying the user about a potentially compromised network device 104 before the user uses their user device 102 to communicate with the network device 104.

In one embodiment, the authentication device 106 may also send a security alert to an operator in response to determining that the device fingerprint 116 from the network device 104 does not match the previously stored device fingerprint 116 for the network device 104. In this case, the authentication device 106 sends the security alert to notify the operator about a potentially compromised network device 104. In response to receiving the security alert, the operator may repair the network device 104 and investigate whether the network device 104 has been compromised.

In one embodiment, the authentication device 106 may also send a signal 130 to transition the network device 104 from an online state to an offline state in response to determining that the device fingerprint 116 from the network device 104 does not match the previously stored device fingerprint 116 for the network device 104. The signal 130 may be any suitable type of command or instructions that can be interpreted by the network device 104. In response to receiving the signal 130 from the authentication device 106, the network device 104 transitions from an online state to an offline state. When the network device 104 transitions to the offline state, the network device 104 is no longer able to connect with user devices 102 or to exchange data with user devices 102. This process prevents the potentially compromised network device 104 from access data from user devices 102. This process allows an operator to take the network device 104 offline until the operator is able to repair the network device 104 and to investigate whether the network device 104 has been compromised In one embodiment, the authentication device 106 may also send device configuration request 132 to the network device 104 in response to determining that the device fingerprint 116 from the network device 104 does not match the previously stored device fingerprint 116 for the network device 104. The network device 104 sends device information 134 to the authentication device 106 in response to receiving the device configuration request 132. The device information 134 may comprise a software configuration, a hardware configuration, a firmware configuration, location information, temperature information, device tampering status information, or any other suitable type or combination of information about the network device 104. After receiving the device information 134, the authentication device 106 may analyze the device information 134 to determine whether the network device 104 has been tampered with.

In one embodiment, the authentication device 106 may also send a data log request 136 to the network device 104 in response to determining that the device fingerprint 116 from the network device 104 does not match the previously stored device fingerprint 116 for the network device 104. The network device 104 sends a data log 138 to the authentication device 106 in response to receiving the data log request 136. The data log 138 may comprise transaction information, connection history information, service history, software update history, or any other suitable type of data history for the network device 104. After receiving the data log 138, the authentication device 106 may analyze the data log 138 to determine whether the network device 104 has been tampered with.

Hardware Configuration for an Authentication Device

Figure 3:
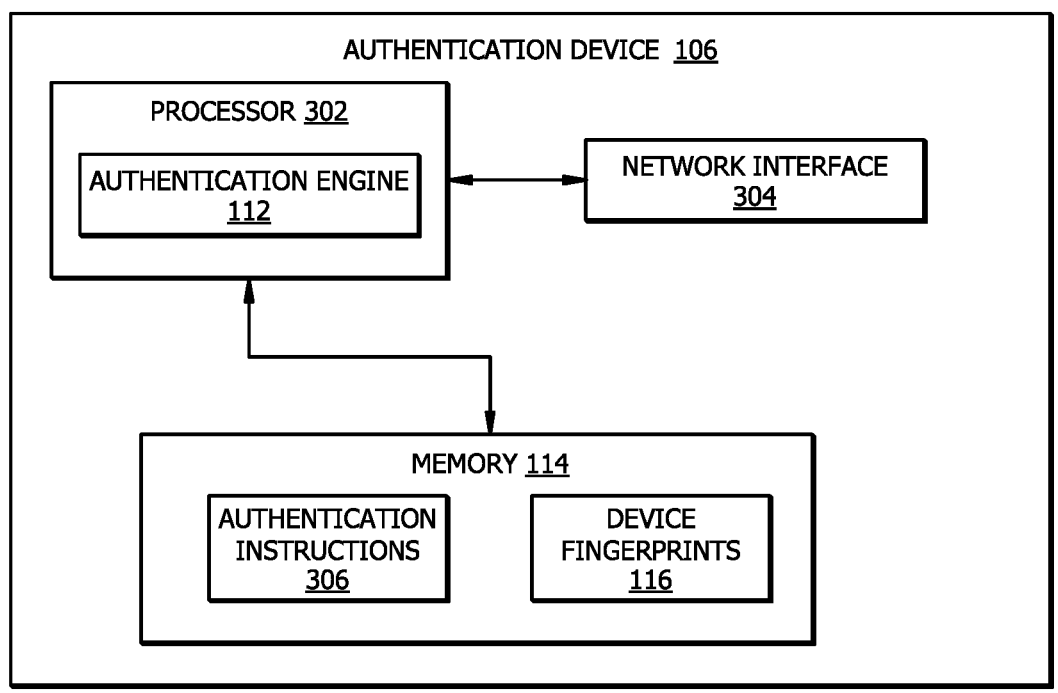
FIG. 3 is an embodiment of an authentication device for the information security system.

FIG. 3 is an embodiment of a device (e.g. authentication device 106) of an information security system 100. As an example, the authentication device 106 comprises a processor 302, a memory 114, and a network interface 304. The authentication device 106 may be configured as shown or in any other suitable configuration.

Processor

The processor 302 comprises one or more processors operably coupled to the memory 114. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 114. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute authentication instructions 306 to implement an authentication engine 112. In this way, processor 302 may be a special-purpose computer designed to implement the functions disclosed herein. In an embodiment, the authentication engine 112 is implemented using logic units, FPGAs, ASICs, DSPs, or any other suitable hardware. The authentication engine 112 is configured to operate as described in FIGS. 1-2. For example, the authentication engine 112 may be configured to perform the steps of process 200 as described in FIG. 2.

Memory

The memory 114 is operable to store any of the information described above with respect to FIGS. 1-2 along with any other data, instructions, logic, rules, or code operable to implement the function(s) described herein when executed by the processor 302. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store authentication instructions 306, device fingerprints 116, and/or any other data or instructions. The authentication instructions 306 may comprise any suitable set of instructions, logic, rules, or code operable to execute the authentication engine 112. The device fingerprints 116 are configured similar to the device fingerprints 116 described in FIGS. 1-2.

Network Interface

The network interface 304 is configured to enable wired and/or wireless communications. The network interface 304 is configured to communicate data between the authentication device 106 and other devices (e.g. user devices 102 and network devices 104), systems, or domains. For example, the network interface 304 may comprise an NFC interface, a Bluetooth interface, Zigbee interface, a Z-wave interface, an RFID interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An authentication device, comprising:
a memory operable to store a plurality of device fingerprints, wherein:
   each device fingerprint is uniquely associated with a device; and
   each device fingerprint comprises a unique bit string that is generated based on a configuration of a device; and
a processor operably coupled to the memory, configured to:
   receive an authentication request from a user device, wherein the authentication request comprises a device identifier;
   identify a first device that is associated with the device identifier;
   send a device fingerprint request to the first device;
   receive a first device fingerprint for the first device in response to sending the device fingerprint request;
   identify a second device fingerprint that is associated with the first device from among the plurality of device fingerprints;
   compare the first device fingerprint to the second device fingerprint; and
   send an authentication response to the user device based on the comparison.

2. The device of claim 1, wherein sending the authentication response comprises sending an authentication confirmation in response to determining that the first device fingerprint matches the second device fingerprint.

3. The device of claim 1, wherein sending the authentication response comprises sending an error message in response to determining that the first device fingerprint does not match the second device fingerprint.

4. The device of claim 1, wherein the processor is further configured to send a security alert to an operator in response to determining that the first device fingerprint does not match the second device fingerprint.

5. The device of claim 1, wherein the processor is further configured to send a signal to the first device to transition the first device from an online state to an offline state in response to determining that the first device fingerprint does not match the second device fingerprint.

6. The device of claim 1, wherein the processor is further configured to:
   send a device configuration request to the first device in response to determining that the first device fingerprint does not match the second device fingerprint; and
   receive device information for the first device in response to sending the device configuration request.

7. The device of claim 1, wherein the processor is further configured to:
   send a data log request to the first device in response to determining that the first device fingerprint does not match the second device fingerprint; and
   receive a data log for the first device in response to sending the device configuration request.

8. A device authentication method, comprising:
   receiving an authentication request from a user device, wherein the authentication request comprises a device identifier;
   identifying a first device that is associated with the device identifier;
   sending a device fingerprint request to the first device;
   receiving a first device fingerprint for the first device in response to sending the device fingerprint request, wherein:
      the first device fingerprint is uniquely associated with the first device; and
      the first device fingerprint comprises a unique bit string that is generated based on a configuration of the first device;
   identifying a second device fingerprint that is associated with the first device from among a plurality of device fingerprints stored in a memory;
   comparing the first device fingerprint to the second device fingerprint; and
   sending an authentication response to the user device based on the comparison.

9. The method of claim 8, wherein sending the authentication response comprises sending an authentication confirmation in response to determining that the first device fingerprint matches the second device fingerprint.

10. The method of claim 8, wherein sending the authentication response comprises sending an error message in response to determining that the first device fingerprint does not match the second device fingerprint.

11. The method of claim 8, further comprising sending a security alert to an operator in response to determining that the first device fingerprint does not match the second device fingerprint.

12. The method of claim 8, further comprising sending a signal to the first device to transition the first device from an online state to an offline state in response to determining that the first device fingerprint does not match the second device fingerprint.

13. The method of claim 8, further comprising:
sending a device configuration request to the first device in response to determining that the first device fingerprint does not match the second device fingerprint; and
receiving device information for the first device in response to sending the device configuration request.

14. The method of claim 8, further comprising:
sending a data log request to the first device in response to determining that the first device fingerprint does not match the second device fingerprint; and
receiving a data log for the first device in response to sending the device configuration request.

15. An information security system, comprising:
one or more network devices, wherein each network device is configured to wirelessly exchange data with one or more user devices; and
an authentication device in signal communication with the one or more network device, comprising:
a memory operable to store a plurality of device fingerprints, wherein:
each device fingerprint is uniquely associated with a device; and
each device fingerprint comprises a unique bit string that is generated based on a configuration of a device; and
a processor operably coupled to the memory, configured to:
receive an authentication request from a user device, wherein the authentication request comprises a device identifier;
identify a network device that is associated with the device identifier;
send a device fingerprint request to the network device;
receive a first device fingerprint for the network device in response to sending the device fingerprint request;
identify a second device fingerprint that is associated with the network device from among the plurality of device fingerprints;
compare the first device fingerprint to the second device fingerprint; and
send an authentication response to the user device based on the comparison.

16. The system of claim 15, wherein sending the authentication response comprises sending an authentication confirmation in response to determining that the first device fingerprint matches the second device fingerprint.

17. The system of claim 15, wherein sending the authentication response comprises sending an error message in response to determining that the first device fingerprint does not match the second device fingerprint.

18. The system of claim 15, wherein the authentication device is further configured to send a signal to the network device to transition the network device from an online state to an offline state in response to determining that the first device fingerprint does not match the second device fingerprint.

19. The system of claim 15, wherein the authentication device is further configured to:
send a device configuration request to the network device in response to determining that the first device fingerprint does not match the second device fingerprint; and
receive device information for the network device in response to sending the device configuration request.

20. The system of claim 15, wherein the authentication device is further configured to:
send a data log request to the network device in response to determining that the first device fingerprint does not match the second device fingerprint; and
receive a data log for the network device in response to sending the device configuration request.

* * * * *